(12) United States Patent
Currivan et al.

(10) Patent No.: US 8,891,699 B2
(45) Date of Patent: Nov. 18, 2014

(54) CHARACTERIZATION AND ASSESSMENT OF COMMUNICATION CHANNEL AVERAGE GROUP DELAY VARIATION

(75) Inventors: Bruce J. Currivan, Los Altos, CA (US); Thomas J. Kolze, Phoenix, AZ (US); Jonathan S. Min, Fullerton, CA (US); Victor T. Hou, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 138 days.

(21) Appl. No.: 13/428,698

(22) Filed: Mar. 23, 2012

(65) Prior Publication Data

US 2012/0243648 A1 Sep. 27, 2012

Related U.S. Application Data

(60) Provisional application No. 61/474,186, filed on Apr. 11, 2011, provisional application No. 61/467,638, filed on Mar. 25, 2011, provisional application No. 61/467,659, filed on Mar. 25, 2011, provisional application No. 61/467,673, filed on Mar. 25, 2011.

(51) Int. Cl.
*H03D 1/04* (2006.01)

(52) U.S. Cl.
USPC .......................................... 375/346

(58) Field of Classification Search
USPC ............... 375/316, 340, 346; 455/39, 67.11, 455/67.16; 370/203, 208, 210
See application file for complete search history.

(56) References Cited

U.S. PATENT DOCUMENTS

| | | | | |
|---|---|---|---|---|
| 4,951,141 | A | * | 8/1990 | Fischer ........................ 348/187 |
| 7,907,909 | B2 | * | 3/2011 | Yu ............................... 455/67.16 |
| 8,559,571 | B2 | * | 10/2013 | Tung et al. .................... 375/346 |
| 2003/0063558 | A1 | * | 4/2003 | Kim ............................. 370/208 |
| 2003/0117940 | A1 | * | 6/2003 | Smallcomb ................... 370/208 |

* cited by examiner

*Primary Examiner* — Vineeta Panwalkar
(74) *Attorney, Agent, or Firm* — Garlick & Markison; Shayne X. Short

(57) ABSTRACT

Characterization and assessment of communication channel average group delay variation. A signal having repeated signal components therein is received by a communication device, and that signal undergoes appropriate processing to determine respective amplitude and phase of a number of frequency bins. The phase difference from bin to bin (including respecting unwrapping, and proper normalization) is used to determine the group delay of a communication channel, or portion thereof, as a function of frequency. Multiple respective group delay measurements may be averaged to generate a wideband group delay of the communication channel as a function of frequency. Overlap between different respective band-edge portions of the communication channel may assist in generating a seamless continuous wideband spectrum estimation for use in determining the wideband group delay of the communication channel.

20 Claims, 10 Drawing Sheets

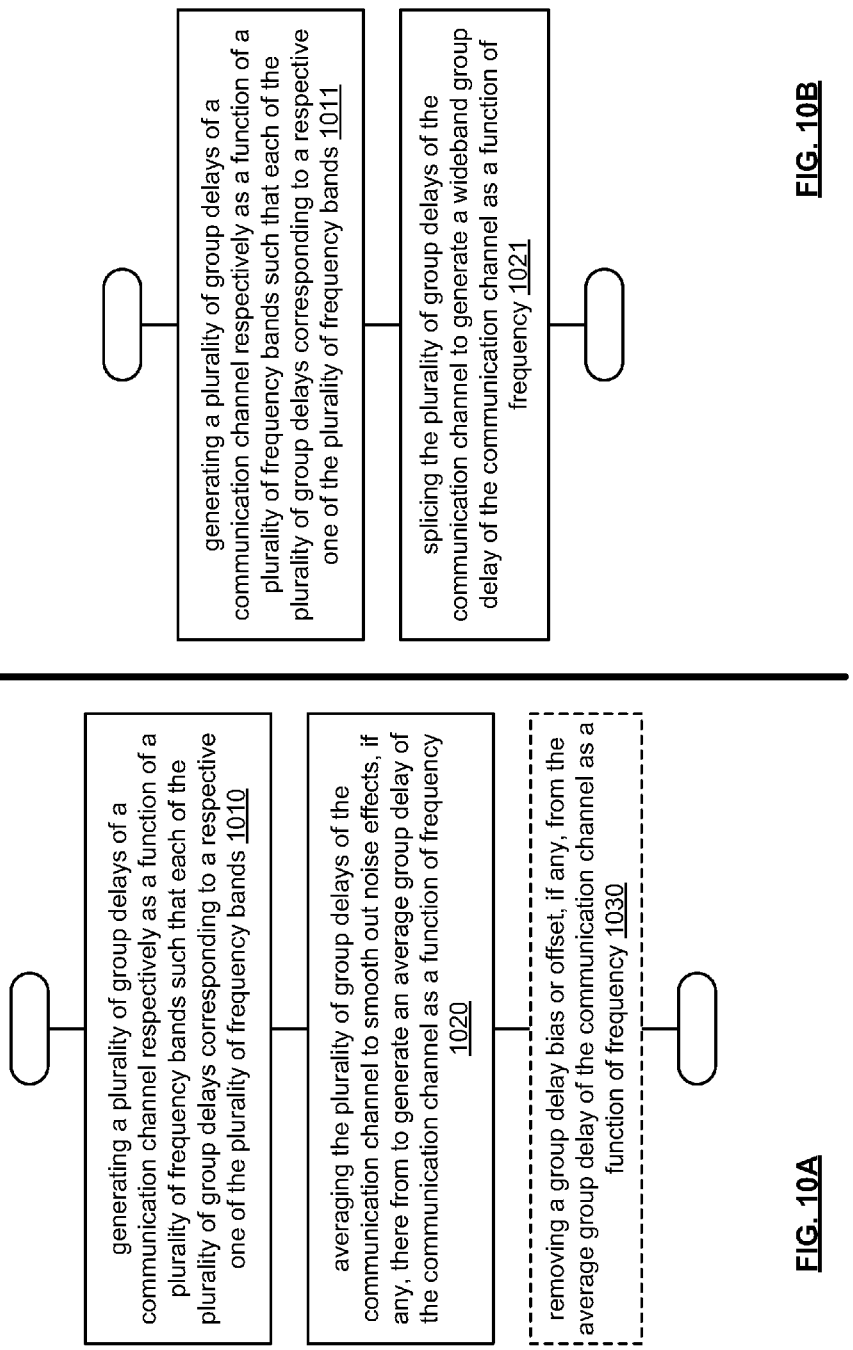

CHARACTERIZATION AND ASSESSMENT OF COMMUNICATION CHANNEL AVERAGE GROUP DELAY VARIATION

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/467,638, entitled "Detection and characterization of laser clipping within communication devices," filed Mar. 25, 2011.
2. U.S. Provisional Patent Application Ser. No. 61/467,659, entitled "Upstream frequency response measurement and characterization," filed Mar. 25, 2011.
3. U.S. Provisional Patent Application Ser. No. 61/467,673, entitled "Upstream burst noise measurement and characterization during data transmission," filed Mar. 25, 2011.
4. U.S. Provisional Patent Application Ser. No. 61/474,186, entitled "Characterization and assessment of communication channel average group delay variation," filed Apr. 11, 2011.

Incorporation by Reference

The following U.S. Utility Patent Applications are hereby incorporated herein by reference in their entirety and made part of the present U.S. Utility Patent Application for all purposes:

1. U.S. Utility Patent Application Ser. No. 13/428,270, entitled "Detection and characterization of laser clipping within communication devices," filed concurrently on Mar. 23, 2012, pending, which claims priority pursuant to 35 U.S.C. §119(e) to the following U.S. Provisional Patent Applications which are hereby incorporated herein by reference in their entirety and made part of the present U.S. Utility Patent Application for all purposes:
    1.1. U.S. Provisional Patent Application Ser. No. 61/467,638, entitled "Detection and characterization of laser clipping within communication devices," filed Mar. 25, 2011.
    1.2. U.S. Provisional Patent Application Ser. No. 61/467,673, entitled "Upstream burst noise measurement and characterization during data transmission," filed Mar. 25, 2011.
2. U.S. Utility patent application Ser. No. 13/428,309, entitled "Upstream frequency response measurement and characterization," filed concurrently on Mar. 23, 2012, pending, which claims priority pursuant to 35 U.S.C. §119(e) to the following U.S. Provisional Patent Application which is hereby incorporated herein by reference in its entirety and made part of the present U.S. Utility Patent Application for all purposes:
    2.1. U.S. Provisional Patent Application Ser. No. 61/467,659, entitled "Upstream frequency response measurement and characterization," filed Mar. 25, 2011.
3. U.S. Utility patent application Ser. No. 13/428,357, entitled "Upstream burst noise measurement and characterization," filed concurrently on Mar. 23, 2012, pending, which claims priority pursuant to 35 U.S.C. §119(e) to the following U.S. Provisional Patent Applications which are hereby incorporated herein by reference in their entirety and made part of the present U.S. Utility Patent Application for all purposes:
    3.1. U.S. Provisional Patent Application Ser. No. 61/467,638, entitled "Detection and characterization of laser clipping within communication devices," filed Mar. 25, 2011.
    3.2. U.S. Provisional Patent Application Ser. No. 61/467,673, entitled "Upstream burst noise measurement and characterization during data transmission," filed Mar. 25, 2011.

BACKGROUND OF THE INVENTION

1. Technical Field of the Invention

The invention relates generally to communication systems; and, more particularly, it relates to group delay characterization and/or assessment of communication channels within such communication systems.

2. Description of Related Art

Data communication systems have been under continual development for many years. With such a communication system, characterization and/or estimation of any of a number of different parameters may be performed. For example, the communication channels are communication links over which signals traverse between communication devices may be analyzed for any of a number of reasons. For example, certain communication devices may perform appropriate processing of signals transmitted there from or received thereby based upon such characterization to improve the overall operation not only of those respective communication devices but the overall communication system. While the need to perform such characterization and/or estimation of various parameters within communication systems is well known, the prior art nonetheless continues to provide less than ideal solutions by which this may be made. As such, there continues to be a need to make such characterization and/or estimation of various parameters within communication systems in a better, more accurate, and more efficient way.

BRIEF DESCRIPTION OF THE SEVERAL VIEWS OF THE DRAWINGS

FIG. 10A and FIG. 10B illustrate various alternative embodiments of methods for operating at least one communication device.

DETAILED DESCRIPTION OF THE INVENTION

Figure 1:
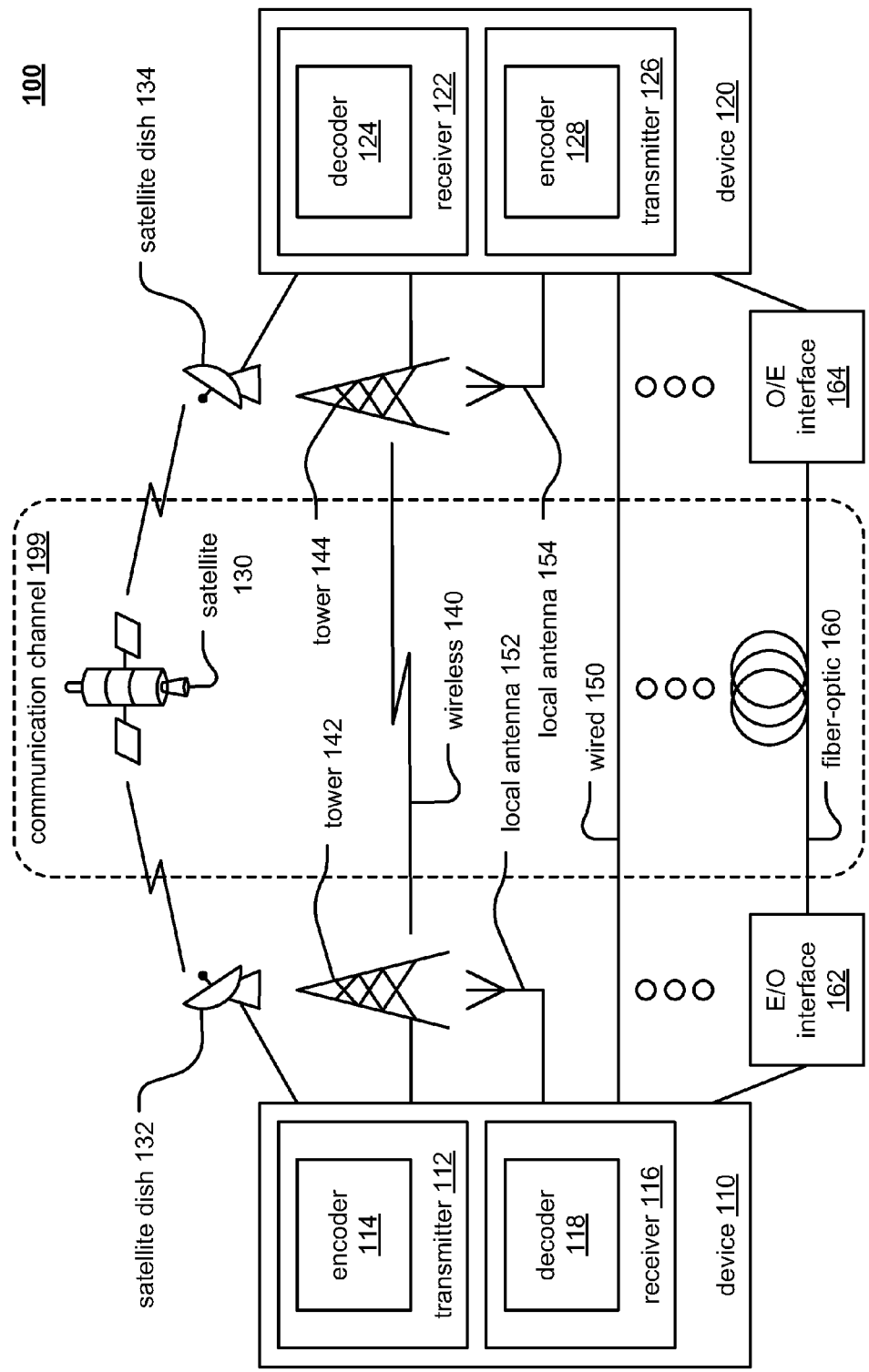
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
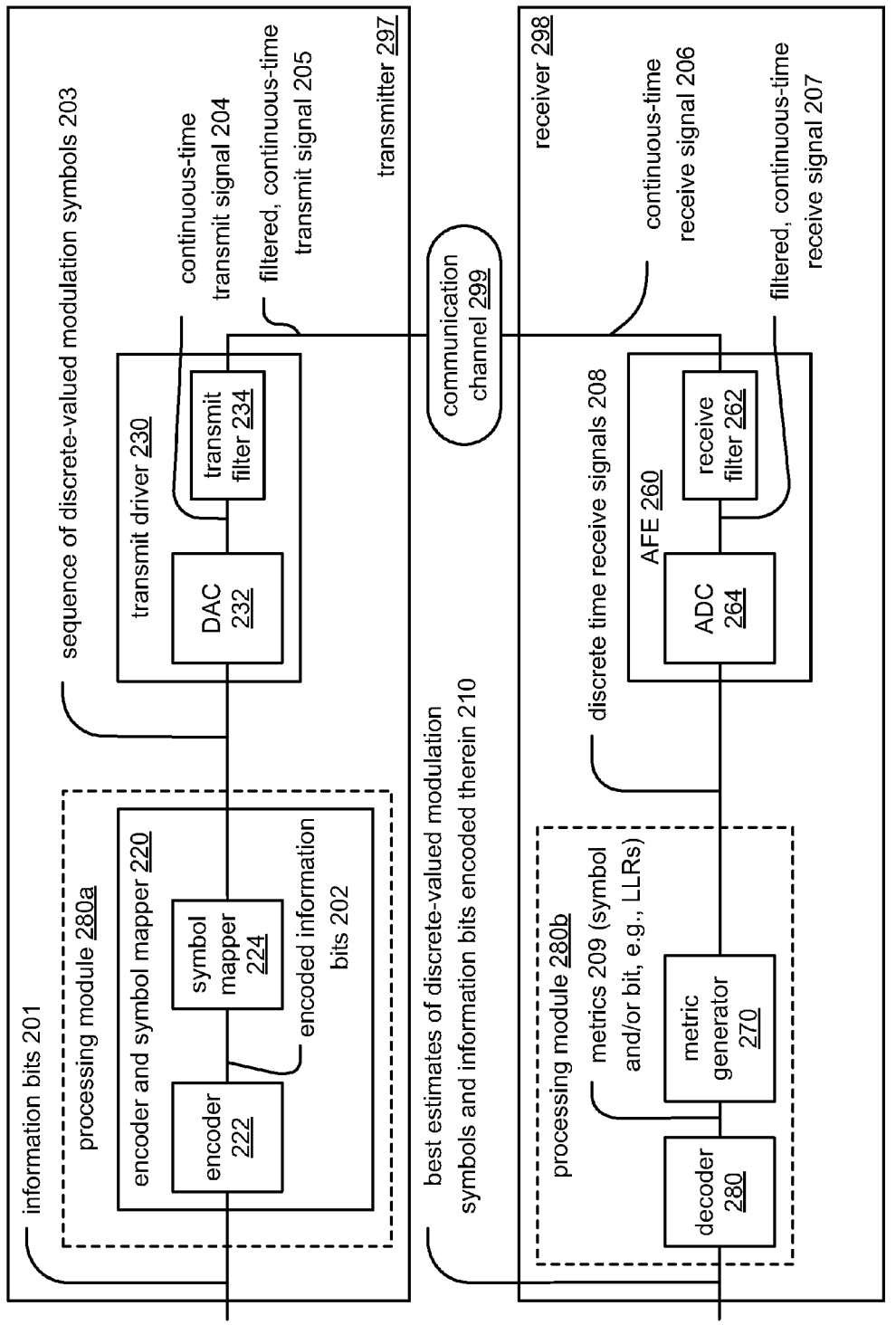

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
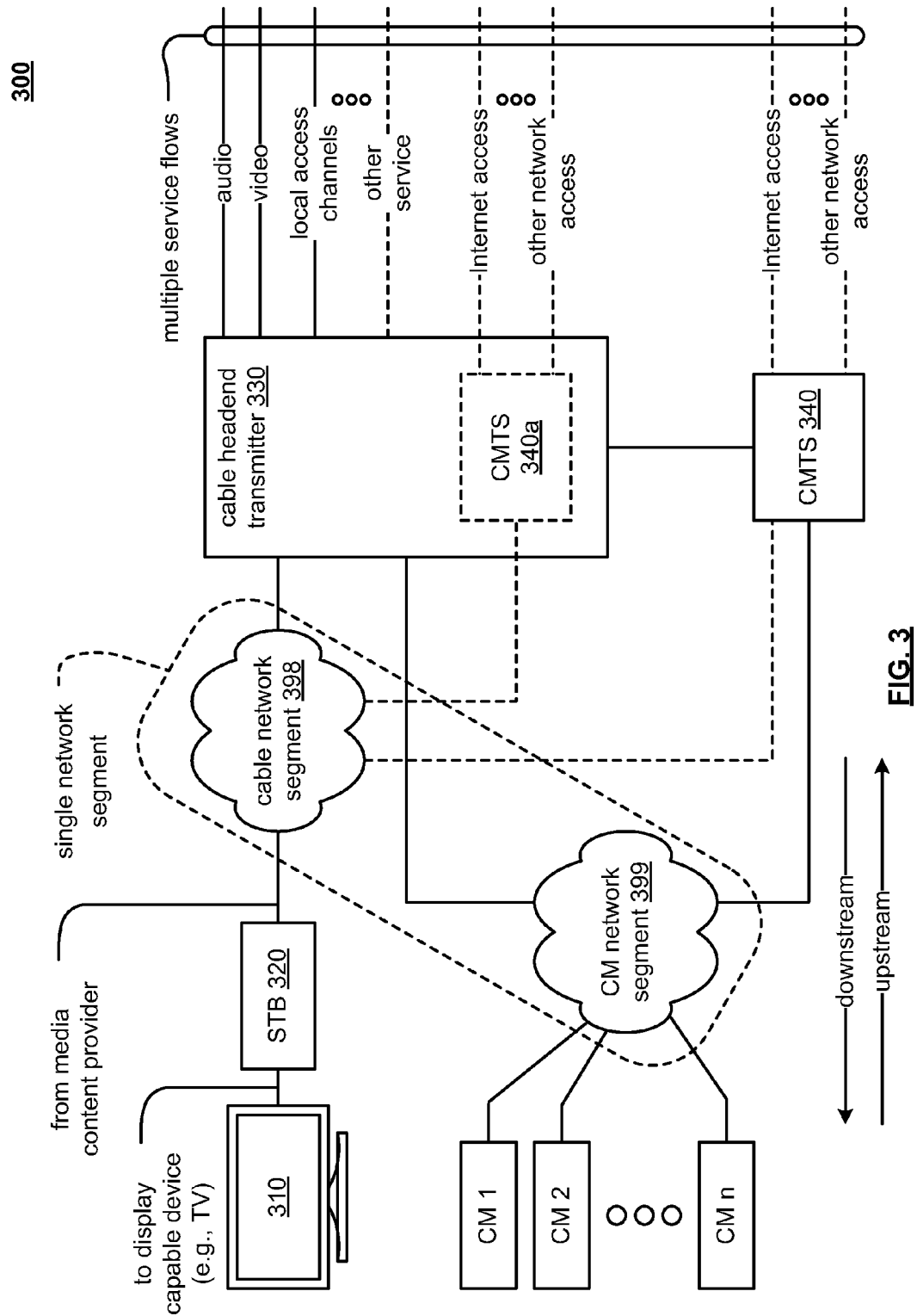

Referring to the communication system 300 of FIG. 3, this communication system 300 may be viewed particularly as being a cable system. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's headend, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the headend, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340a may also be coupled to the cable network segment 398, as the STB 320 may itself include cable modem functionality therein.

It is also noted that any one of the cable modems 1, 2, . . . m n, the cable headend transmitter 330, the CMTS 340 or 340a, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Figure 4:
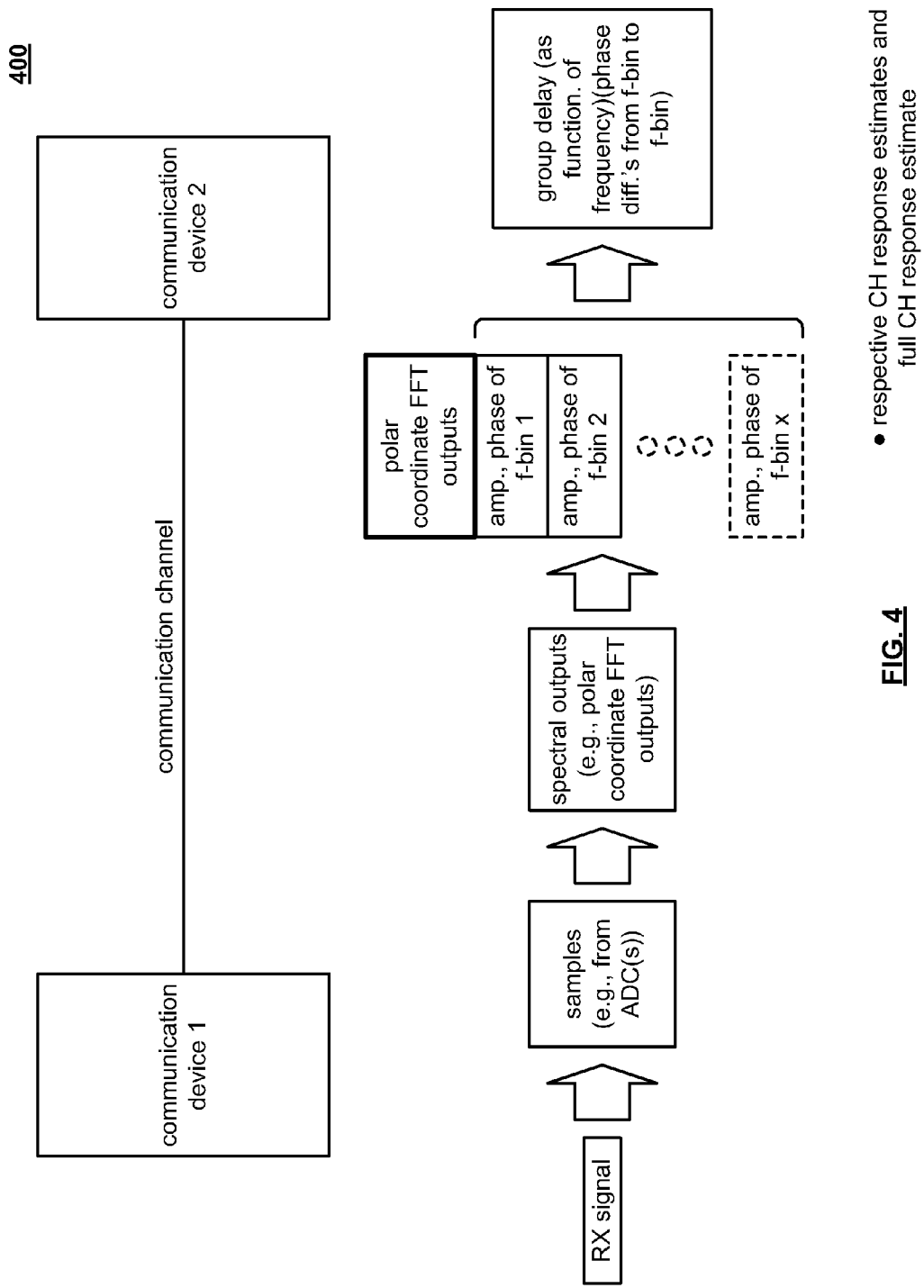
FIG. 4 illustrates an embodiment of communications between respective communication devices in a communication system, and respective group delay estimates made with respect to different respective frequency bins.

FIG. 4 illustrates an embodiment 400 of communications between respective communication devices in a communication system, and respective group delay estimates made with respect to different respective frequency bins. As may be seen with respect to this diagram, communications may be supported between respective communication devices within the communication system.

Within a given communication device, a signal may be received from a communication channel. Such a signal may include a number of repeated signal components therein. For example, by having repetition of one or more signal components within the signal, the signal will have certain repetitive (e.g., cyclic) properties.

A means for performing sampling of a continuous time signal (e.g., such as by an analog to digital converter (ADC)), which may be implemented within an analog front end (AFE) of the communication device) is operative to generate a number of samples. These respective samples undergo appropriate processing to generate spectral outputs. For example, in certain embodiments, fast Fourier transform (FFT) processing may be made on the samples to generate corresponding FFT outputs. These FFT outputs may undergo processing to generate polar coordinate FFT outputs, such that each of the polar coordinate FFT outputs corresponds to a respective amplitude and phase of a corresponding frequency bin. Group delay may then be determined as a function of frequency by considering the phase difference from bin to bin of these respective amplitudes and phases (e.g., those corresponding to the respective frequency bins).

FIG. 5, FIG. 6, FIG. 7, and FIG. 8 illustrates various respective embodiments of respective group delay estimates at different respective center frequencies and/or frequency bands, and their relationship to a wideband group delay estimate.

Certain of these respective diagrams show alternative embodiments by which respective group delay estimates may be made with respect to different respective frequencies or frequency bands.

Figure 5:
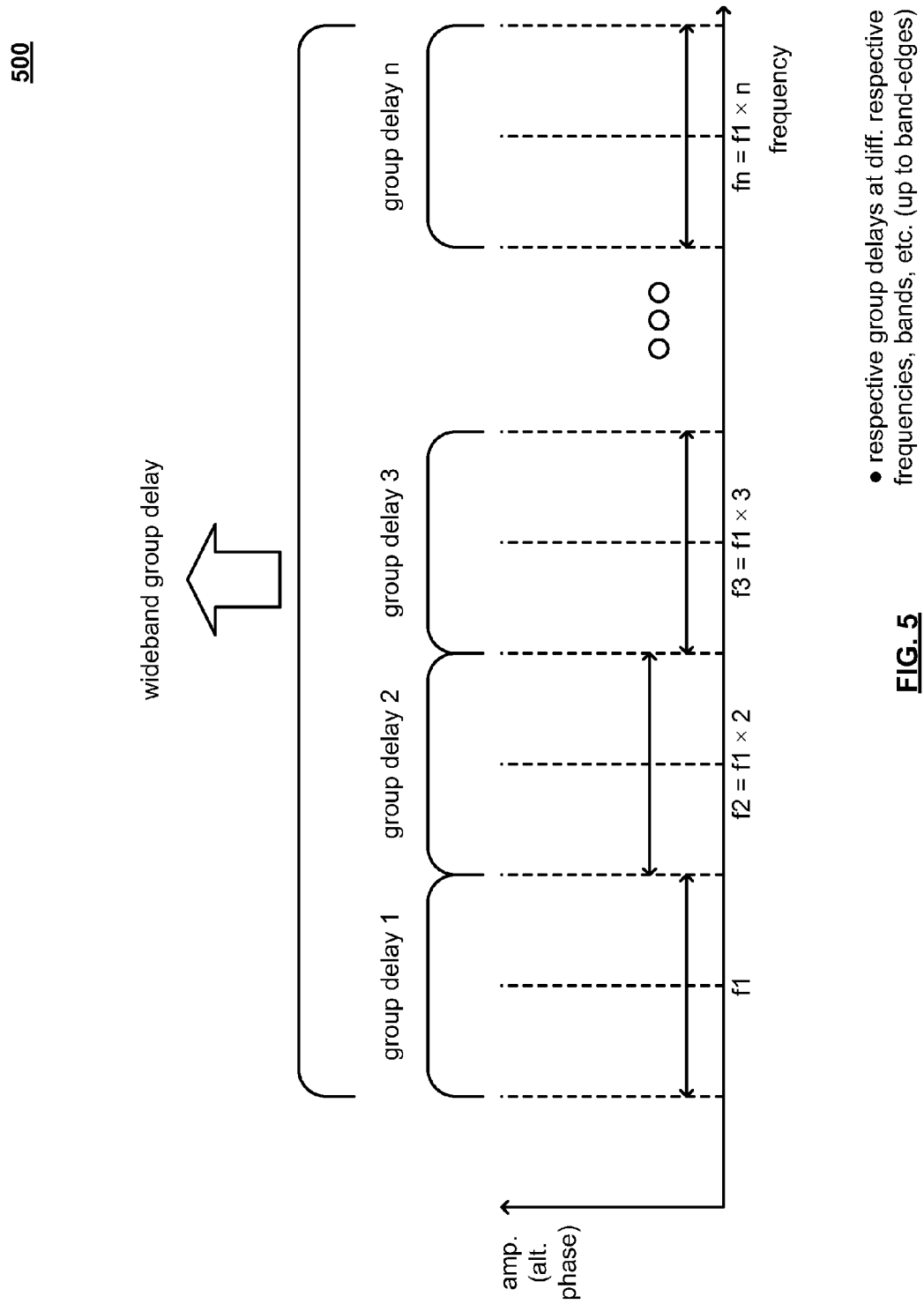
FIG. 5, FIG. 6, FIG. 7, and FIG. 8 illustrates various respective embodiments of respective group delay estimates at different respective center frequencies and/or frequency bands, and their relationship to a wideband group delay estimate.

Referring to the embodiment 500 of FIG. 5, as may be seen with respect to this diagram, a number of respective frequency bands are implemented with respect to a first frequency, f1. Each of the respective center frequencies of the higher frequency bands is shown as being a respective integer multiple of the first frequency. In accordance with this particular diagram, different respective group delay estimates are generated for each of the respective bands, and those group delay estimates are spliced or combined together to generate a wideband group delay estimate. As may be understood, such a wideband group delay estimate is a wideband group delay estimate. In addition, with respect to this diagram, each of the respective frequency bands extends directly up to a band edge, with no overlap into adjacent bands and with no guard interval in between the respective bands.

Figure 6:
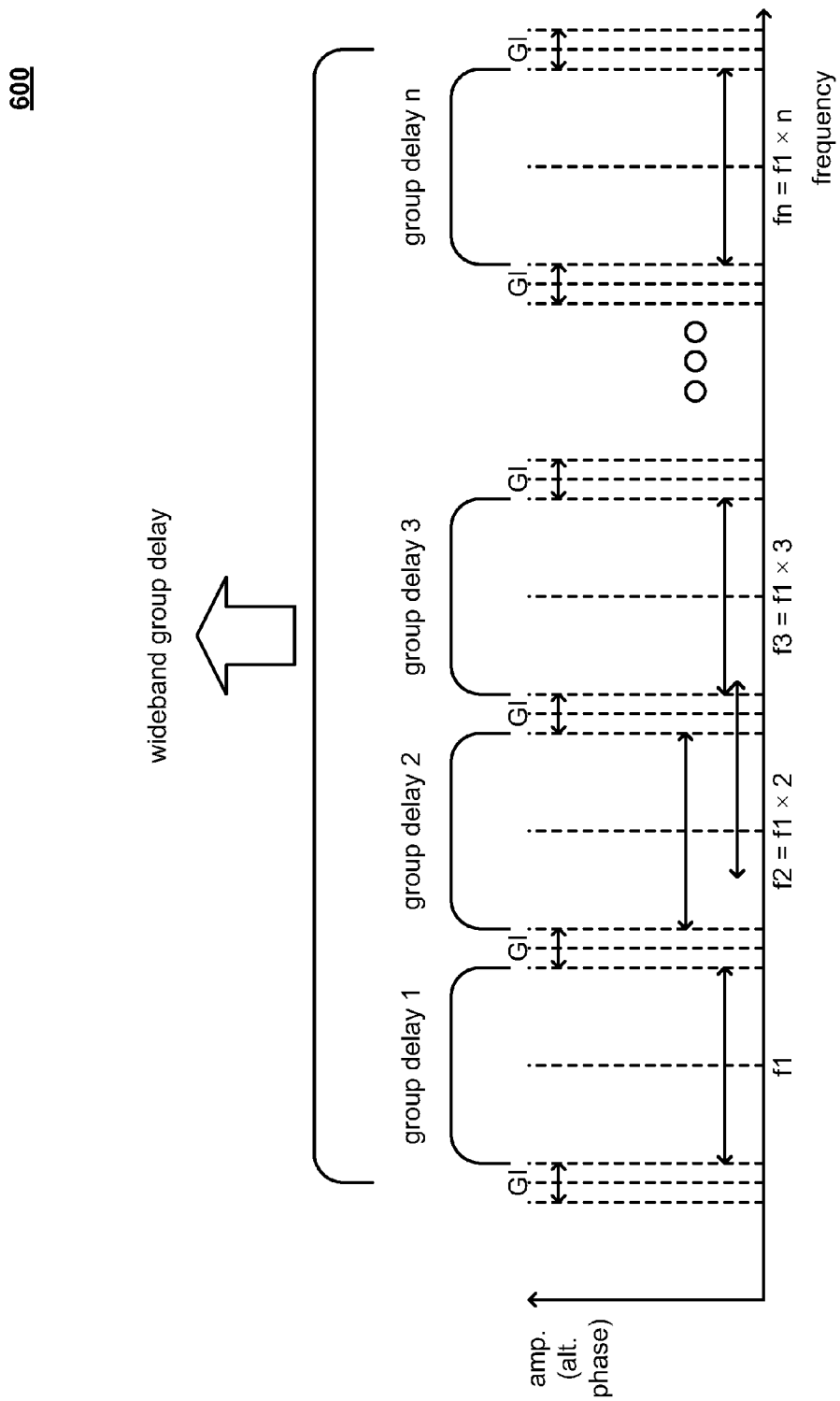

Referring to the embodiment 600 of FIG. 6, with respect to this diagram, a number of respective guard intervals (GIs) are implemented at the edges of the respective frequency bands. Such GIs may be viewed as occurring at the outer limits (e.g., lower and upper) of each respective frequency bands in an effort to ensure little or no interaction between the respective frequency bands. In accordance with the respective group delay estimates generated by such frequency bands separated by respective guard intervals, it may be understood that certain smoothing effects may be made and performed when splicing and combining together the different respective group delay estimates.

Figure 7:
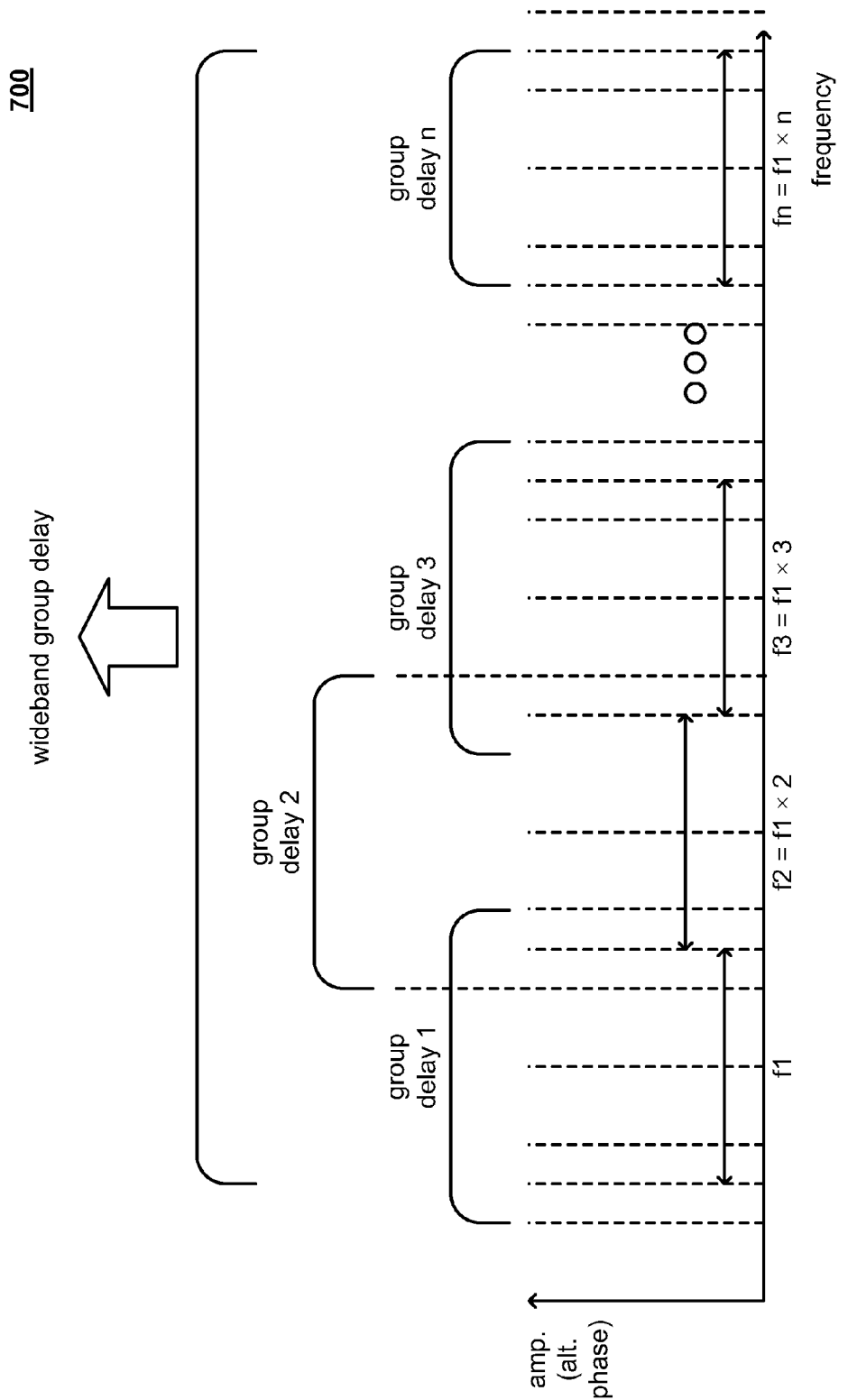

Referring to the embodiment 700 of FIG. 7, in this diagram, the various respective frequency bands have some overlap with one another. The respective group delay estimates associated with these respective frequency bands may provide a smoother transition and a more seamless combination of the respective group delay estimates in generating the wideband group delay estimate.

Figure 8:
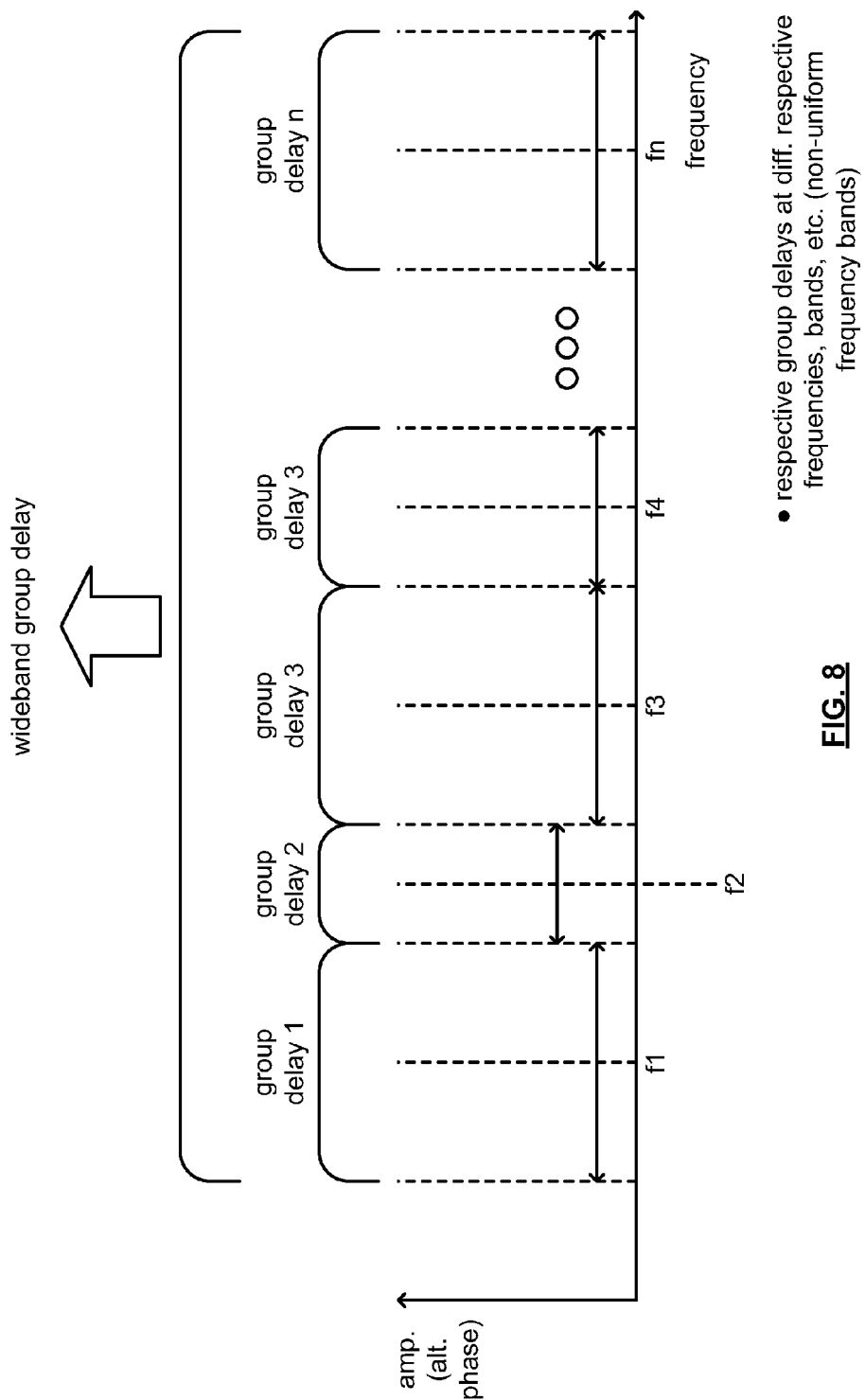

Referring to the embodiment 800 of FIG. 8, as may be seen with respect to this diagram, the frequency bands are of non-uniform width. Generally, any desired widths of respective frequency bands may be employed in accordance with generating different respective group delay estimates across a relatively wider portion of the frequency spectrum. For example, there may be some instances in which narrowband channels and relatively wider band channels are employed in combination with one another in a communication system.

Moreover, there may be some instances in which the center frequencies and/or frequency bandwidths of the various frequency bands may be modified over time, such as in accordance with a dynamic or adaptive implementation. Any desired partitioning of the frequency spectrum into different respective frequency bands having different respective center frequencies may be used in accordance with various aspects, and their equivalents, of the invention.

Within a given communication system, one or more of the various communication channels therein may vary as a function of time (e.g., be variant as a result of a number of parameters including operating conditions, processing load of the various communication devices within the communication system, environmental condition changes, undesirable noise being introduced, etc.).

Also, in certain communication systems, characterization and assessment of variation in an average group delay within the communication system can be performed to provide for improved operation of the communication system and signaling between the various communication devices therein. Averaging the group delay of several fast Fourier transforms (FFTs) of an upstream signal can benefit from accurate timing, or perhaps from a cyclic prefix. A constant amplitude zero auto-correlation (CAZAC) sequence having cyclical properties may be used in some embodiments. For example, in accordance with operating in accordance with a data over cable service interface specification (DOCSIS) communication protocol, or recommended practices, a DOCSIS preamble employed therein may have cyclical properties. However, if the given CAZAC sequence is of a relatively short length or duration (e.g., length 16), more than one (e.g., multiple) repetition may be needed to effectuate the cyclical properties benefits.

It is also noted that, while the term "FFT" is employed with respect to certain embodiments, diagrams, etc., herein, it is generally noted that any of a number of different types of signal processing (e.g., spectral (digital) signal analysis) may be performed including fast Fourier transform (FFT) processing, discrete Fourier transform (DFT) processing, filter bank processing, etc. and/or any other form of signal processing including digital signal processing (e.g., such as may be performed using any spectral (digital) signal analysis such as by digital signal processor(s) (DSP(s)), FFT processor(s), DFT processor(s), one or more filters (such as using a filter bank), etc.).

In some alternative embodiments, any pseudo-random (PR) training sequence kernel p(n) may be repeated so that it appears to have such cyclic properties to the FFT. For example, a signal composed of [p(n), p(n), . . . p(n)] may be sent. This may be viewed as employing a concatenated string composed of the same PR sequence, p(n), as the training sequence. In such an embodiment, the FFT length may be designed to encompass a number of symbols equal to a multiple of the length of p(n).

Example 1

Consider an embodiment in which the FFT is length 2048 and runs at 4 samples per symbol after the Nyquist filter, so the FFT length covers 512 symbols. The kernel p(n) would be a pseudo-random sequence of length 512. Define c(n) as the cyclic prefix including a certain number of the previous/last symbols (e.g., the previous/last 16 symbols) of p(n). The training sequence that would be sent would then be [c(n), p(n)].

In an embodiment, a sequence of length 528 symbols including the last 16 symbols of p(n) followed by p(n) in its entirety. Since the maximum DOCSIS 2.0/3.0 preamble length is 768 symbols, this would be compliant in accordance with standard DOCSIS operation.

Example 2

In another embodiment, a shorter kernel may be employed so that smaller FFTs could be taken. In that case, a kernel p(n) could be chosen to be a pseudo-random (PR) sequence of length 128. For the training sequence, a plurality of repetitions of the kernel p(n) could be made (e.g., 5 repetitions such as generating the sequence [p(n), p(n), p(n), p(n), p(n)]). This would be a sequence of length 640 symbols. This would allow FFTs of length 256, 512, 1024, or 2048 to be taken, or for that matter, any discrete Fourier transform (DFT) length that is an integer multiple of 128.

The implementation and use of such a cyclic prefix (e.g., in accordance with a full or partial repetition of the signal) may be employed and adapted for use within orthogonal frequency division multiplexing (OFDM) receiver design techniques.

A. Capture FFT Samples, take FFT, Compute Amplitude and Group Delay

The number of samples from an analog to digital converter (ADC) that are captured equals the desired FFT length; for example, 4096 complex samples at 4 samples per symbol at the Nyquist filter output, for a 4K FFT. This corresponds to an integer number of repetitions of the kernel p(n). Take the FFT and convert the complex output to polar coordinates, that is, amplitude and phase of each FFT bin. Take the phase difference from bin to bin (respecting unwrapping, and properly normalizing) to get relationship of the group delay as a function of frequency. Also, it is noted that, in certain embodiments, explicit conversion to polar coordinates is not necessarily required. For example, one or more formulae may be developed for computation of group delay directly from in-phase (I) and quadrature (Q) samples (e.g., using trigonometric functions and/or their respective approximations).

B. Average Several Amplitude and Group Delay Measurements

The amplitude measurement is straightforward. The magnitude of each complex FFT bin is squared ($I^2+Q^2$), for in-phase and quadrature components, and multiple FFT power measurements are averaged bin-by-bin.

This embodiment allows for a timing uncertainty in the capture of the FFT samples. Due to the cyclic repetition, the measured received-signal group delay may exhibit an offset or DC bias equal to the timing uncertainty. However, if consideration is being made with respect to group delay variation across the band (e.g., as opposed absolute group delay), the incursion or existence of such an offset or DC bias equal to the timing uncertainty may have little or no consequence.

Next, the group delay measurements from several FFTs may be averaged in order to smooth out noise effects from the measurement. As each FFT has its own group delay bias, the result is then the averaged (smoothed) group delay plus the average of the biases. Again, the incursion or existence of such an offset or DC bias equal will not be problematic if consideration is being made with respect to group delay variation across the band (e.g., as opposed absolute group delay). If desired, the group delay bias or offset may be removed and set to zero for now. The desired offset will be determined in the following step C, in which overlapping bands are adjusted for seamless continuous wideband spectrum estimation.

For example, 100 FFTs may be averaged in power and group delay, to give a smoothed spectrum estimate of a given band, such as a 5.12 MHz DOCSIS channel.

C. Overlap Narrowband Spectra to Produce Wideband Spectrum

In the next step, the narrowband amplitude and group delay measurements from several overlapping frequency bands are spliced together to give a wideband group delay representation of the channel. The splicing uses overlap in order to resolve the uncertainties at the band edges, as explained in the following example.

Example 3

Assume symbol rate fb=5.12 MHz and excess bandwidth a=25% with square-root raised-cosine transmit and receive filter shaping. The occupied bandwidth is fb(1+a)=6.4 MHz. The passband has width fb(1−a)=0.75 fb=3.84 MHz.

The measurement across the upstream band may be conservatively and safely stepped up with a step size of a little less than 0.75 fb. For example, the step size may be fb(1+a)/2=3.2 MHz, or 62.5% of the symbol rate, giving an overlap of 37.5%. This means that a 4096-point FFT will overlap the previous and next FFTs in 1536 points at each end, which is more than enough to smoothly transition between the amplitude and group delay measurements going from one band to another.

D. Compute Channel Spectrum from Transmitted and Received Spectra

So far the power spectrum and group delay variation of the received signal phase have been measured. However, our interest is mainly in the transfer function (frequency response including amplitude and group delay vs. frequency) of the upstream signal channel (e.g., such as in accordance with an upstream cable channel in a cable communication system such as with reference to FIG. 3).

For this, correction of the received spectrum may be made by removing the known transmitted spectrum at each bin. The transmitted spectrum is a known quantity since the training sequence is known. We take the FFT of the known transmitted training sequence, taking into account filtering effects in the transmitter including the known pre-equalizer coefficients. Then, this FFT is processed as above to get the amplitude and group delay variation vs. frequency. The processing of the transmitted signal is the same as the above processing of the received signal, except that no averaging of multiple FFTs is required for the transmitted signal, since it is known and thus is noise-free. As such, no smoothing is required in such an embodiment. The amplitude response of the communication channel is then obtained by dividing the amplitude response of the received signal by the amplitude response of the transmitted signal. The group delay response of the channel is obtained by subtracting the group delay response of the transmitted signal from the group delay response of the received signal. Further adjustments may be made if calibration data is available for a transmitter communication device and/or receiver communication device.

In accordance with the various aspects and principles, and their equivalents, of the invention, multiple FFTs can be averaged to develop a smooth group delay measurement. The training sequence used for such an embodiment should be cyclic with respect to the FFT length, to allow for timing uncertainty in the capture of the FFT samples in the receiver.

Figure 9:
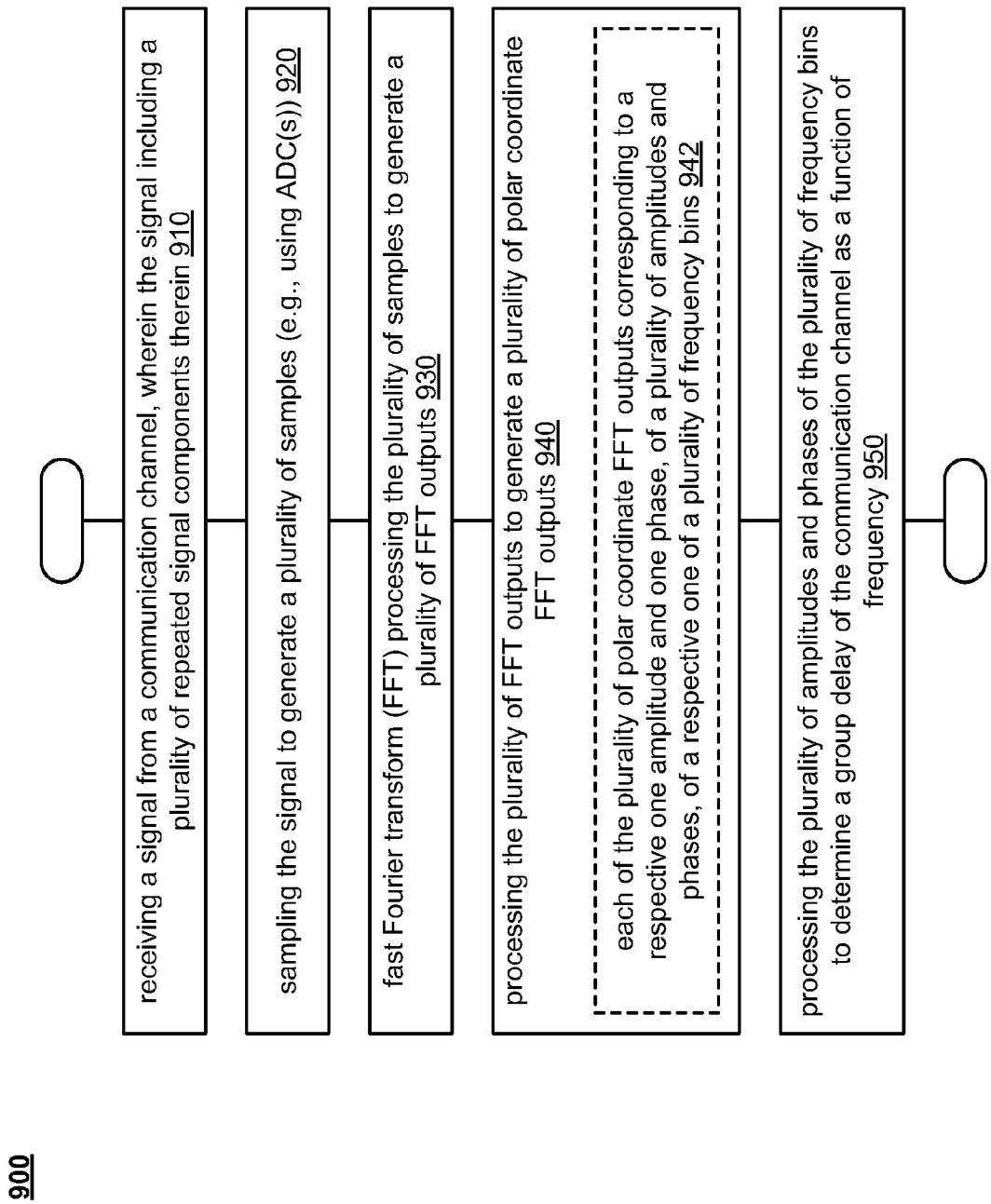
FIG. 9 illustrates an embodiment of a method for operating at least one communication device.

FIG. 9 illustrates an embodiment of a method 900 for operating at least one communication device.

Referring to method 900 of FIG. 9, the method 900 begins by receiving a signal from the communication channel, as shown in a block 910. The signal includes a number of repeated signal components therein. The method 900 continues by sampling the signal to generate a plurality of samples (e.g., such as by using one or more analog to digital converters (ADCs)), as shown in a block 920. The method 900 continues by fast Fourier transform (FFT) processing the plurality of samples to generate a plurality of FFT outputs, as shown in a block 930.

The method 900 then operates by processing the plurality of FFT outputs to generate a plurality of polar coordinate FFT outputs, as shown in a block 940.

In certain alternative embodiments, each of the plurality of polar coordinate FFT outputs may be viewed as corresponding to a respective one amplitude in one phase, of a plurality of amplitudes in phases, other respective one of a plurality of frequency bins, as shown in a block 942. That is to say, a given amplitude and phase generated from certain FFT outputs corresponds to a particular frequency bin.

The method 900 continues by processing the plurality of amplitudes in phases of the plurality of frequency bins to determine a group delay of the communication channel as a function of frequency, as shown in a block 950. For example, in certain embodiments, the phase difference from bin to bin (respecting unwrapping, proper normalizing, etc.) is used to determine the group delay as a function of frequency.

FIG. 10A and FIG. 10B illustrate various alternative embodiments 1000 and 1001 of methods for operating at least one communication device.

Referring to method 1000 of FIG. 10A, the method 1000 begins by generating a plurality of group delays of a communication channel respectively as a function of a plurality of frequency bands such that each of the plurality of group delays corresponding to a respective one of the plurality of frequency bands, as shown in a block 1010.

The method 1000 continues by averaging the plurality of group delays of the communication channel to smooth out noise effects, if any, there from to generate average group delay of the communication channel as a function of frequency, as shown in a block 1020.

In certain alternative embodiments, the method 1000 then operates by removing a group delay bias are offset, if any, from the average group delay the communication channel as a function of frequency, as shown in a block 1030.

Referring to method 1001 of FIG. 10B, the method 1001 begins by generating a plurality of group delays of a communication channel respectively as a function of a plurality of frequency bands such that each of the plurality of group delays corresponding to a respective one of the plurality of frequency bands, as shown in a block 1011.

The method 1001 then operates by splicing the plurality of group delays of the communication channel to generate a wideband group delay of the communication channel as a function of frequency, as shown in a block 1021.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 (or alternatively, when the magnitude of signal 2 is less than that of signal 1).

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, electrical, optical, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
   an input configured to receive a signal from a communication channel, wherein the signal including a plurality of repeated signal components having cyclic properties therein;
   an analog to digital converter (ADC) configured to sample the signal to generate a plurality of samples; and
   a processor configured to:
      fast Fourier transform (FFT) process the plurality of samples to generate a plurality of FFT outputs;
      process the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins; and
      process the plurality of amplitudes and phases of the plurality of frequency bins to determine a group delay of the communication channel as a function of frequency;
      generate a plurality of group delays of the communication channel respectively as a function of a plurality of frequency bands, including the group delay of the communication channel as a function of frequency, such that each of the plurality of group delays corresponding to a respective one of the plurality of frequency bands; and
      splice the plurality of group delays of the communication channel to generate a wideband group delay of the communication channel as a function of frequency.

2. The apparatus of claim 1 further comprising:
   a communication device that is operative within at least one of a satellite communication system, a wireless communication system, a wired communication system, a fiber-optic communication system, a mobile communication system, and a cable system.

3. An apparatus comprising:

an input configured to receive a signal from a communication channel, wherein the signal including a plurality of repeated signal components having cyclic properties therein;

an analog to digital converter (ADC) configured to sample the signal to generate a plurality of samples; and a processor configured to:

fast Fourier transform (FFT) process the plurality of samples to generate a plurality of FFT outputs;

process the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;

process the plurality of amplitudes and phases of the plurality of frequency bins to determine a group delay of the communication channel as a function of frequency;

generate a plurality of group delays of the communication channel respectively as a function of a plurality of frequency bands, including the group delay of the communication channel as a function of frequency, such that each of the plurality of group delays corresponding to a respective one of the plurality of frequency bands; and average the plurality of group delays of the communication channel to smooth out noise effects, if any, there from to generate an average group delay of the communication channel as a function of frequency.

4. The apparatus of claim 3 further comprising:

the processor configured to remove a group delay bias or offset, if any, from the average group delay of the communication channel as a function of frequency.

5. The apparatus of claim 3 further comprising:

a communication device operative within at least one of a satellite communication system, a wireless communication system, a wired communication system, a fiber-optic communication system, a mobile communication system, and a cable system.

6. An apparatus comprising:

an input configured to receive a signal from a communication channel, wherein the signal including a plurality of repeated signal components having cyclic properties therein;

an analog to digital converter (ADC) configured to sample the signal to generate a plurality of samples; and a processor configured to:

fast Fourier transform (FFT) process the plurality of samples to generate a plurality of FFT outputs;

process the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;

process the plurality of amplitudes and phases of the plurality of frequency bins to determine a group delay of the communication channel as a function of frequency; and generate a plurality of group delays of the communication channel respectively as a function of a plurality of frequency bands, including the group delay of the communication channel as a function of frequency, such that each of the plurality of group delays corresponding to a respective one of the plurality of frequency bands, wherein center frequencies of the plurality of frequency bands being respectively and uniformly spaced apart in frequency by a frequency increment.

7. The apparatus of claim 6 further comprising:

a communication device that is operative within at least one of a satellite communication system, a wireless communication system, a wired communication system, a fiber-optic communication system, a mobile communication system, and a cable system.

8. An apparatus comprising:

an input configured to receive a signal from a communication channel, wherein the signal including a plurality of repeated signal components having cyclic properties therein;

an analog to digital converter (ADC) configured to sample the signal to generate a plurality of samples; and a processor configured to:

fast Fourier transform (FFT) process the plurality of samples to generate a plurality of FFT outputs;

process the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;

process the plurality of amplitudes and phases of the plurality of frequency bins to determine a group delay of the communication channel as a function of frequency; and overlap a band-edge portion of a first of the plurality of group delays corresponding to a first of the plurality of frequency bands and a band-edge portion of a second of the plurality of group delays corresponding to a second of the plurality of frequency bands to generate the wideband group delay of the communication channel as a function of frequency.

9. The apparatus of claim 8 further comprising:

a communication device that is operative within at least one of a satellite communication system, a wireless communication system, a wired communication system, a fiber-optic communication system, a mobile communication system, and a cable system.

10. An apparatus comprising:

an input configured to receive a signal from a communication channel, wherein the signal including a plurality of repeated signal components having cyclic properties therein;

an analog to digital converter (ADC) configured to sample the signal to generate a plurality of samples; and a processor configured to:

fast Fourier transform (FFT) process the plurality of samples to generate a plurality of FFT outputs;

process the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;

process the plurality of amplitudes and phases of the plurality of frequency bins to determine a group delay of the communication channel as a function of frequency; and compensate for a group delay associated with a predetermined signal coupled to the apparatus via the communication channel to generate the average group delay of the communication channel as a function of frequency.

11. The apparatus of claim 10 further comprising:
a communication device that is operative within at least one of a satellite communication system, a wireless communication system, a wired communication system, a fiber-optic communication system, a mobile communication system, and a cable system.

12. A method for execution by a communication device, the method comprising:
via an input of the communication device, receiving a signal from a communication channel, wherein the signal including a plurality of repeated signal components having cyclic properties therein;
sampling the signal to generate a plurality of samples;
fast Fourier transform (FFT) processing the plurality of samples to generate a plurality of FFT outputs;
processing the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;
processing the plurality of amplitudes and phases of the plurality of frequency bins to determine a group delay of the communication channel as a function of frequency;
generating a plurality of group delays of the communication channel respectively as a function of a plurality of frequency bands, including the group delay of the communication channel as a function of frequency, such that each of the plurality of group delays corresponding to a respective one of the plurality of frequency bands; and
splicing the plurality of group delays of the communication channel to generate a wideband group delay of the communication channel as a function of frequency.

13. The method of claim 12, wherein the communication device is operative within at least one of a satellite communication system, a wireless communication system, a wired communication system, a fiber-optic communication system, a mobile communication system, and a cable system.

14. A method for execution by a communication device, the method comprising:
via an input of the communication device, receiving a signal from a communication channel, wherein the signal including a plurality of repeated signal components having cyclic properties therein;
sampling the signal to generate a plurality of samples;
fast Fourier transform (FFT) processing the plurality of samples to generate a plurality of FFT outputs;
processing the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;
processing the plurality of amplitudes and phases of the plurality of frequency bins to determine a group delay of the communication channel as a function of frequency;
generating a plurality of group delays of the communication channel respectively as a function of a plurality of frequency bands, including the group delay of the communication channel as a function of frequency, such that each of the plurality of group delays corresponding to a respective one of the plurality of frequency bands; and
averaging the plurality of group delays of the communication channel to smooth out noise effects, if any, there from to generate an average group delay of the communication channel as a function of frequency.

15. The method of claim 14 further comprising:
removing a group delay bias or offset, if any, from the average group delay of the communication channel as a function of frequency.

16. The method of claim 14, wherein the communication device is operative within at least one of a satellite communication system, a wireless communication system, a wired communication system, a fiber-optic communication system, a mobile communication system, and a cable system.

17. A method for execution by a communication device, the method comprising:
via an input of the communication device, receiving a signal from a communication channel, wherein the signal including a plurality of repeated signal components having cyclic properties therein;
sampling the signal to generate a plurality of samples;
fast Fourier transform (FFT) processing the plurality of samples to generate a plurality of FFT outputs;
processing the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;
processing the plurality of amplitudes and phases of the plurality of frequency bins to determine a group delay of the communication channel as a function of frequency; and
generating a plurality of group delays of the communication channel respectively as a function of a plurality of frequency bands, including the group delay of the communication channel as a function of frequency, such that each of the plurality of group delays corresponding to a respective one of the plurality of frequency bands, wherein center frequencies of the plurality of frequency bands being respectively and uniformly spaced apart in frequency by a frequency increment.

18. The method of claim 17, wherein the communication device is operative within at least one of a satellite communication system, a wireless communication system, a wired communication system, a fiber-optic communication system, a mobile communication system, and a cable system.

19. A method for execution by a communication device, the method comprising:
via an input of the communication device, receiving a signal from a communication channel, wherein the signal including a plurality of repeated signal components having cyclic properties therein;
sampling the signal to generate a plurality of samples;
fast Fourier transform (FFT) processing the plurality of samples to generate a plurality of FFT outputs;
processing the plurality of FFT outputs to generate a plurality of polar coordinate FFT outputs, wherein each of the plurality of polar coordinate FFT outputs corresponding to a respective one amplitude and one phase, of a plurality of amplitudes and phases, of a respective one of a plurality of frequency bins;
processing the plurality of amplitudes and phases of the plurality of frequency bins to determine a group delay of the communication channel as a function of frequency; and
overlapping a band-edge portion of a first of the plurality of group delays corresponding to a first of the plurality of frequency bands and a band-edge portion of a second of the plurality of group delays corresponding to a second of the plurality of frequency bands to generate the wideband group delay of the communication channel as a function of frequency.

20. The method of claim 19, wherein the communication device is operative within at least one of a satellite communication system, a wireless communication system, a wired communication system, a fiber-optic communication system, a mobile communication system, and a cable system.

\* \* \* \* \*